United States Patent
Quilici et al.

(10) Patent No.: US 10,757,250 B1
(45) Date of Patent: Aug. 25, 2020

(54) SYSTEM AND METHOD FOR USING PUBLIC REGISTRY TO ENHANCE CALLER INFORMATION AND DETERMINE CALL HANDLING FOR CALLED PARTIES

(71) Applicant: YouMail, Inc., Irvine, CA (US)

(72) Inventors: Alexander E. Quilici, Malibu, CA (US); Michael J. Rudolph, San Juan Capistrano, CA (US)

(73) Assignee: YouMail, Inc., Irvine, CA (US)

( * ) Notice: Subject to any disclaimer, the term of this patent is extended or adjusted under 35 U.S.C. 154(b) by 0 days.

(21) Appl. No.: 16/876,933

(22) Filed: May 18, 2020

Related U.S. Application Data

(60) Provisional application No. 62/849,502, filed on May 17, 2019.

(51) Int. Cl.
*H04M 3/42* (2006.01)
*H04M 1/57* (2006.01)
*H04M 3/436* (2006.01)

(52) U.S. Cl.
CPC ......... *H04M 3/42059* (2013.01); *H04M 1/57* (2013.01); *H04M 3/42042* (2013.01); *H04M 3/436* (2013.01)

(58) Field of Classification Search
CPC ............... H04M 3/42059; H04M 1/57; H04M 3/42042; H04M 3/436
USPC ..................................................... 379/201.01
See application file for complete search history.

(56) References Cited

U.S. PATENT DOCUMENTS

2003/0191676 A1* 10/2003 Templeton ....... G06Q 10/06311
    705/7.19
2006/0195540 A1* 8/2006 Hamilton .............. H04L 61/605
    709/206

* cited by examiner

*Primary Examiner* — Quynh H Nguyen
(74) *Attorney, Agent, or Firm* — Meister Seelig & Fein LLP; Seth H. Ostrow, Esq.

(57) ABSTRACT

Systems and methods are provided for using a registry to assure parties receiving a communication, such as an incoming phone call, that the party sending the communication, such as the caller is, who it appears to be. In some embodiments the registry is a publicly accessible database which stores communication identifiers such as telephone numbers for parties in association with other data including data provided by the parties or others. The other data may include the name of the party associated with the identifier, a cryptographic public key used by the party as part of a public/private key pair, data representing the intent of the party in sending a communication, and parameters set by parties to be satisfied to receive communications or in determining how such communications should be handled. The system may provide the data representing the party's specific intention in that call or other communication to the party receiving the communication.

20 Claims, 4 Drawing Sheets

SYSTEM AND METHOD FOR USING PUBLIC REGISTRY TO ENHANCE CALLER INFORMATION AND DETERMINE CALL HANDLING FOR CALLED PARTIES

CROSS REFERENCE TO RELATED APPLICATION

This application claims the priority of U.S. Provisional Application No. 62/849,502, entitled "SYSTEM AND METHOD FOR USING PUBLIC REGISTRY TO ENHANCE CALLER INFORMATION AND DETERMINE CALL HANDLING FOR CALLED PARTIES," filed on May 17, 2019, the disclosure of which is hereby incorporated by reference in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Field of the Invention

This disclosure relates generally to the field of communications, and more specifically, but not exclusively, to using registry containing information about calling parties and their calling intentions, which can in turn be used for called parties which can decide how to handle calls based on the calling party and its intentions.

Description of the Related Art

Users of communication devices such as landline telephones or smartphones often receive unwanted calls, text messages or other communications from unknown communicators. These communicators may be telemarketers who sequentially or randomly call or otherwise communicate with many different users on an unsolicited basis. Mobile communication device users often find their activities interrupted by such unwanted calls or communications. In some instances, the caller is attempting to defraud the user through the communication.

Increasingly, these communications are robocall—calls or other communications placed by machines with prerecorded messages or interactive voice response scripts. Robocallers can hide their caller identification by displaying fake caller identifications to the user. The frequency of robocalls has increased over the past several years, and there is a great need to identify, filter and block these robocalls.

Existing systems and tools currently used for filtering incoming communications are inadequate in solving these problems. For example, users can register their telephone numbers on the Federal Trade Commission's "Do Not Call Registry." Registering telephone numbers can prevent certain telemarketers from calling but does not prevent scammers and other unwanted callers from calling or sending other communications, as many ignore the Do Not Call Registry or have found mechanisms by which they are excluded from its applicability.

As another example, users can block specific telephone numbers on their mobile devices which have already been pre-identified, by the users or by an app they are using, as telephone numbers belonging to unwanted callers. By blocking lists of pre-identified telephone numbers, the mobile device might either show the number on the user's device then block the call after a brief ringing or not notify the user when a call is received from these specific telephone numbers by suppressing any auditory or visual indication of the call. However, devices such as smartphones, or apps running on these devices, are required to know which telephone numbers belong to unwanted callers before this type of blocking can occur. This is particularly the case when many mobile devices lack data connectivity at the time of an incoming call. While the mechanisms in the device or apps require knowing which telephone numbers are unwanted in order to block them, this can be error prone as robocallers often use hundreds or thousands of different numbers to make these calls and will continuously use new numbers which have not been used previously and been loaded into these blocking lists —especially considering robocallers are aware that users are blocking them using these methods.

As another example of existing systems, carrier networks, such as AT&T Wireless and Verizon Wireless, provide services for blocking specific telephone numbers and/or screening incoming calls and alerting users on their mobile devices whether the incoming call is a wanted or unwanted caller. Most methods provided by carrier networks utilize lists, often referred to as white lists and black lists, of already identified numbers to provide these screening and blocking capabilities. This method can be deficient because the white list or black list is based on prior behavior of those numbers and doesn't account well for a number without a prior reputation or a call which is spoofing a number that has a good reputation for an unwanted purpose.

Some existing third-party applications use similar methods to block unwanted incoming calls. For example, a third-party application can screen and/or block unwanted incoming calls by utilizing a list of spammers, telemarketers or other classifications of unwanted callers and employ methods of ensuring the user is not disturbed by unwanted callers. Similar to the carrier network methods, these third-party applications rely on lists of pre-identified numbers which are deficient for reasons described above.

The current solutions are thus incomplete when it comes to answering only desired calls and avoiding disturbance by unwanted calls. The issue with static lists compiled from past behavior, inclusive of the moment before the current incoming call, is they provide no or minimal coverage on a number that has not yet had its reputation categorized. Furthermore, they do not have any insight into whether the current incoming call is actually an unwanted call but that is using a number with a good reputation that is categorized as desired. For example, a scammer may spoof their outbound call as the phone number of a bank and the pre-loaded list of good and bad numbers will show that the call is potentially a good call from a bank but in reality the call is being made from a scammer pretending to be that bank. Additionally, after some number of users receive spoofed calls from scammers pretending to be a bank, they may shift the reputation of that number which is otherwise legitimately used by that bank into one that is no longer wanted, so that when that bank uses that number for a legitimate communication it shows up as a scam and is blocked or otherwise tagged as an unwanted communication.

Therefore, there is a need for improved methods and systems for properly and reliably identifying a caller and its intentions in communicating with a called party.

SUMMARY OF THE INVENTION

A brief summary of various embodiments is presented below. Embodiments address the need to create a system and method for utilizing a digital registry where calling parties can manage their identity and the reason they both generally place calls and the reason they are making a specific call to a called party. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

In order to overcome these and other shortcomings of the prior art, systems and methods are provided for using a registry to assure parties receiving a communication, such as an incoming phone call, that the party sending the communication, such as the caller, is who it appears to be. In some embodiments the registry is a publicly accessible database which stores communication identifiers such as telephone numbers for parties in association with other data including data provided by the parties or others. The other data may include the name of the party associated with the identifier, a cryptographic public key used by the party as part of a public/private key pair, data representing the intent of the party in sending a communication, and parameters set by parties to be satisfied to receive communications or in determining how such communications should be handled. The system may provide the data representing the party's specific intention in that call or other communication to the party receiving the communication.

The present application discloses methods and systems for validating an incoming communication originating from a first party having a first telephone number and directed to a second party. According to one embodiment, a system comprises a server comprising memory and a processing device configured to determine the first telephone number is associated with a party having a corresponding entry in a publicly accessible registry. The registry comprising a plurality of telephone numbers each associated at least with a public key and additional data representing a communication intent. The processing device is further configured to use a public key associated with the first telephone number in the registry to validate the incoming communication, retrieve communication intent data associated with the first telephone number in the registry, and provide the communication intent data to the second party for display on a device used by the second party in association with the incoming communication.

The server may be further configured to determine the first telephone number is associated with a party having a corresponding entry in a publicly accessible registry by identifying the first telephone number from the incoming communication and searching the registry for the identified first telephone number. The communication intent data may comprise data representing a general intention of communications associated with the first telephone number. In another embodiment, the communication intent data may comprise data specific to communications between the first party and the second party provided either for the specific instance of the incoming communication or to cover a time period of communications between the first and second parties. The server may be configured to retrieve the public key from the registry during or prior to the incoming communication. The communication intent data may include an enhancement to a visual, auditory or physical identification of the incoming communication. The incoming communication may be a telephone call, an electronic message, or a text message.

The server may be configured to determine the first telephone number is not associated with a party having a corresponding entry in the registry and block the incoming communication from going through to the second party. The server may also be configured to determine the first telephone number is not associated with a party having a corresponding entry in the registry, evaluate whether the first party is a wanted or unwanted communicator, and process the incoming communication based on the evaluation. The incoming communication may be digitally signed by the first party using a private key, and the server may be configured to validate the incoming communication by using the public key to decrypt the digitally signed incoming communication.

According to one embodiment, a method is performed by a computerized device comprising memory and a processing device. The method comprising determining the first telephone number is associated with a party having a corresponding entry in a publicly accessible registry. The registry comprising a plurality of telephone numbers each associated at least with a public key and additional data representing a communication intent. The method further comprising using a public key associated with the first telephone number in the registry to validate the incoming communication, retrieving communication intent data associated with the first telephone number in the registry, and providing the communication intent data to the second party for display on a device used by second party in association with the incoming communication.

Determining the first telephone number is associated with a party having a corresponding entry in a publicly accessible registry may further comprise identifying the first telephone number from the incoming communication and searching the registry for the identified first telephone number. The communication intent data may comprise data representing a general intention of communications associated with the first telephone number. The communication intent data may also comprise data specific to communications between the first party and the second party provided either for the specific instance of the incoming communication or to cover a time period of communications between the first and second parties. The method may further comprise retrieving the public key associated with the first telephone number from the registry prior to the incoming communication.

The communication intent data may include an enhancement a visual, auditory or physical identification of the incoming communication. The incoming communication may be a telephone call, an electronic message, or a text message. In one embodiment, the method may further comprise determining the first telephone number is not associated with a party having a corresponding entry in the registry and blocking the incoming communication from going through to the second party. In another embodiment, the method may further comprise determining the first telephone number is not associated with a party having a corresponding entry in the registry, evaluating whether the first party is a wanted or unwanted communicator, and processing the incoming communication based on the evaluation. The incoming communication may be digitally signed by the first party using a private key, and wherein using the public key to validate the incoming communication may comprise using the public key to decrypt the digitally signed incoming communication.

In some embodiments, the party initiating a communication, such as a phone call, may register in a trusted way advance properties of that communication with a central registry, and when the communication is received by another party, the registry is consulted to determine how the communication is to be handled. For example, for a phone call, options for handling the call include whether the phone should ring or whether it should go to voicemail, whether the party making the call should be presented with an out of service message, and whether the call should be sent to a different location or otherwise be denied from reaching the device.

According to some embodiments, the system includes a server including memory and a processing device configured to determine whether details related to an incoming communication have been signed by a private key from a public and private key pair, and, when so signed, utilize the public key for the calling party from the registry to confirm the validity of incoming communication. The processing device is further configured to retrieve additional data regarding the incoming communication from the registry and can use that data to determine how the incoming communication should be handled. Options for handling the communication include, for example, displaying the information if it believes the communication is one that is wanted by the called party, or choosing to screen/block the call if it fails to satisfy parameters the party receiving the communication has set in the registry or on an application running on their device on the type of communication they wish or are willing to receive.

The additional data signed with the communication and validated by the registry may comprise the intentions of the party sending the communication for why it is initiating communication with the called party.

According to other embodiments, the system for validating and handling an incoming communication includes a processor and a memory having executable instructions stored thereon that when executed by the processor cause the processor to determine whether an incoming communication has been signed by a private key from a public and private key pair, retrieve the appropriate public key from the registry, and use the public key to validate the incoming communication. The system may further retrieve additional data about that communication from the registry for the purpose of presenting the data to the party receiving the communication or utilizing that data in determining how the communication should be handled by the called party. In some embodiments, the processor and memory used for this validation with the registry will be the same processor and memory of the communication device that is receiving the inbound communication. For example, the inbound communication may be a smartphone capable of receiving phone calls, text messages and other communications and the smartphone uses data connectivity or locally cached data to validate the incoming call.

In some embodiments, the party receiving the communication may also wish to register in the registry to further enhance the protection and privacy by the systems. In this case the party initiating or sending the communication can determine that the party they wish to communicate with exists in the registry and use the public key of the called party to encrypt the intent of the communications between the two parties. In this manner, other parties would not simply be able to use the public key of calling parties to determine why they may have initiated a given communication but would additionally have require the private key of the called party in order to decrypt the intention of the communication between the two parties. One example of this embodiment would be a bank may wish to initiate communication with a customer and upon determining the customer participates in the registry, obtain that customers public key when they are encrypting their own specific call intentions to that customer. In this manner, only that customer could decrypt the call intention for that communication because their own public key was used by the calling party/bank when it was added to the outbound communications it initiates in the registry.

The additional communication intent data retrieved from the registry be presented or displayed visually, orally or in other ways to the party receiving the communication along with the name and address of the party sending the communication and other identifying information provided in the registry. The method may further protect the party receiving the communication completely whenever any incoming communication lacks an entry in the registry.

Incoming communications pursuant to the invention may consist of telephone calls, text messages, emails, and other electronic communications.

As mentioned above, registry contents for parties initiating communications may include general intentions for communications by those parties from specific numbers, or may contain a specific entry for a specific communication from the party to the recipient party at a specific time. The party initiating communications may determine that it's too much effort to maintain an entry in the registry for every communication and instead simply associate a phone number to have a general intention whenever it's used regardless of the party to which the communication is addressed. The initiating party may also maintain its entry in the registry such that it stipulates that a number or a set of numbers is only used for those general purposes on certain days of the week, certain days of the month, or certain times of day. The validation of a communication of this party could then consult the registry for a particular communication and if it does not meet the general intentions of that party for that number, it could be considered as an invalid instance of a communication by that calling party. For example, a bank could suggest that a given phone number is only used on Tuesdays from noon to 2 pm. As utilized for validating calls from that given phone number, a communication that did not meet that criteria could be discarded as likely spoofed/fabricated because it did not meet the terms by which the calling party suggests that phone number is used for communicating.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

These and other more detailed and specific features are more fully disclosed in the following specification, reference being had to the accompanying drawings, in which.

DETAILED DESCRIPTION OF THE INVENTION

Figure 1:
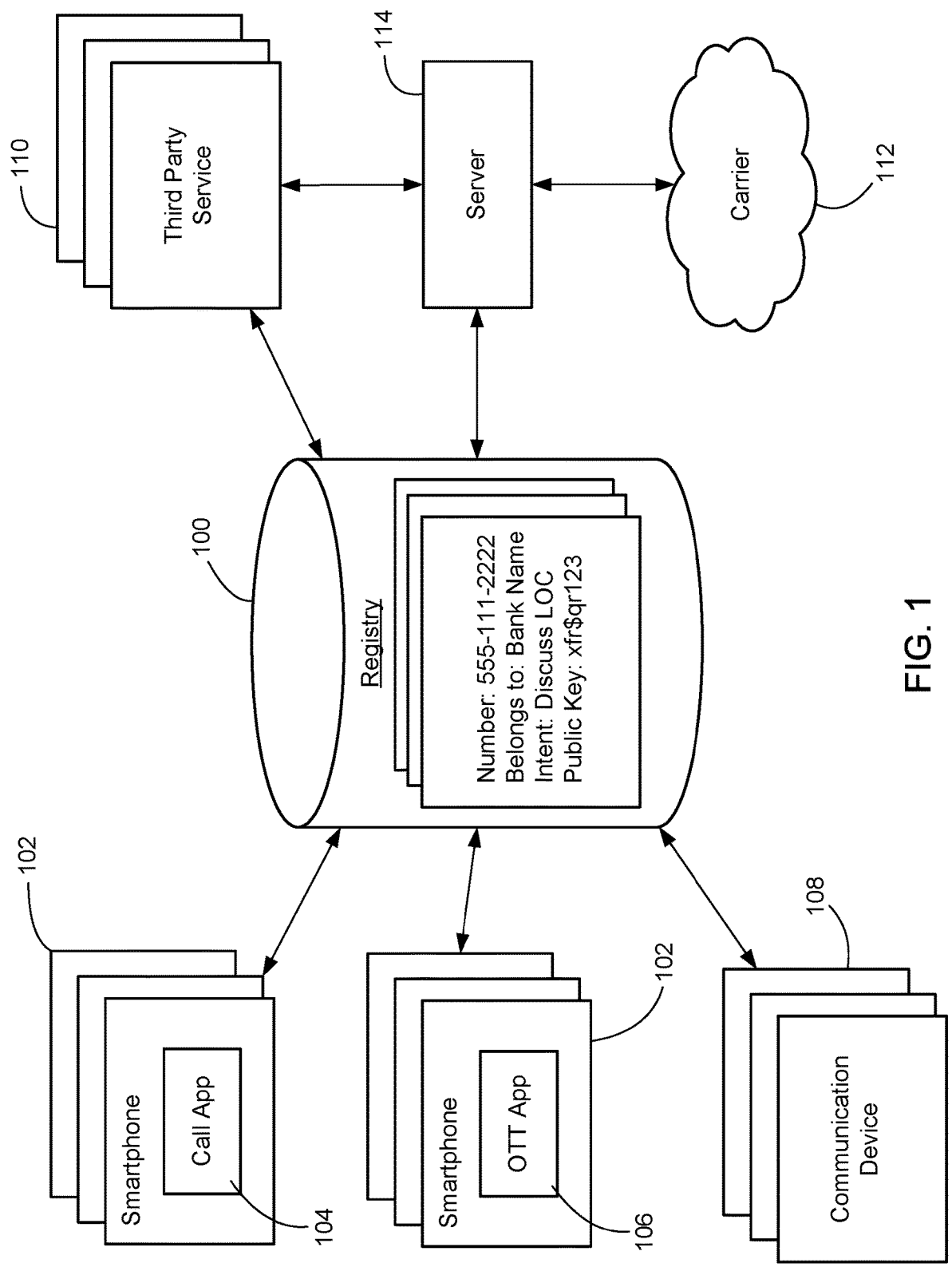
FIG. 1 illustrates a block diagram for a system in which a variety of devices and systems use a publicly available registry database to authenticate callers and provide additional information.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. Descriptors such as "first," "second," "third," etc., are not meant to limit the order of elements discussed, are used to distinguish one element from the next, and are generally interchangeable.

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized, and structural changes may be made without departing from the scope of the present invention. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

The present disclosure provides systems and methods for using a registry to validate incoming communications from callers and provide information, including caller intent, to called parties. The incoming communication can be a telephone call, and embodiments are described herein using telephone calls as the type of communication. The incoming communication can be any other type of communications exchanged between user devices, including electronic mail messages, text messages sent over voice, data or WiFi services, messages sent through apps such as Facebook, Instagram or Snapchat, or other messages. Although many embodiments are described herein in terms of telephone calls or messages sent from telephones having telephone numbers, it would be understood by those of ordinary skill in the art that the same descriptions apply to other message types sent from devices using telephone numbers or other identifiers.

FIG. 1 illustrates a system which includes a registry 100 accessible by a variety of types of devices or systems. In some embodiments, the registry 100 is a caller and call registry database installed in and publicly accessible via a website or other server connected to the Internet. The registry 100 may alternatively be any other form of data structure used to store data that allows systems and users to upload, modify, filter, search and retrieve the stored data. The registry 100 may alternatively be distributed among multiple devices, and duplicates of the registry 100 or a portion thereof may be stored on user devices (e.g., devices 102 and 108) and updated regularly. The registry 100 may be provided with an access control system so that, even though the registry itself is publicly accessible, a login and password would be required to prevent scammers from modifying the data in the registry 100.

The registry 100 can store calling criteria or public keys for callers. The registry 100 may maintain entries for all phone numbers, regardless if the calling party is directly managing their own identity, phone numbers, intentions or communications. The registry 100 can also store additional information provided by the callers themselves, which is publicly or privately available for the purposes of validating calls. The additional information can include the caller's identity or name, the general use of their numbers, specific intentions in a communication between themselves and a called party, or other information. As shown in FIG. 1, for example, an entry may include the telephone number, the identity of the party to which the number belongs (e.g., the name of a bank), the communication intent data (e.g., that the bank uses this number to call parties to discuss letters of credit), and its public key.

In accordance with embodiments of the invention, the registry 100 is used to validate communications made by one party to another, e.g., a call placed from a caller to a called party. The callers can digitally sign their communications to called parties and the public key, stored in the registry 100 in association with the number, can be used to validate the digitally signed communication. The system can thus be configured to route an incoming communication with an encrypted part from one telephone device to another telephone device.

In processing an incoming communication, the registry 100 can be accessed by devices 102 such as, smartphones or device 108 such as, WiFi-enabled tablets. The devices 102, 108 may be running a native call application 104 such as one provided by a wireless carrier or an over the top (OTT) app 106 to identify the number in the incoming communication, search for it in the registry 100 and retrieve the data stored in association with that number including the public key. An OTT app 106 may comprise an application that uses the Internet to connect phone calls (e.g., VoIP) and/or send messages such as, short message service ("SMS") and multimedia message service ("MMS"). An example of such an OTT app 106 may be the YouMail app made and distributed by YouMail Inc., www.youmail.com, the assignee of the present patent application. The registry 100 may be remote from the devices 102, 108 and accessible over a network such as the Internet, or a copy of the registry 100 may be downloaded to and stored locally on the device for use by the local apps 104, 106.

Telephone devices 102 and communication devices 108 can include landline, cellular, analog, digital, satellite and radio that are capable of establishing and receiving telephonic communications via a carrier network, as well as application/application-enabled telephone devices that are capable of establishing and receiving incoming communications via the Internet (e.g., using VoIP). Application-enabled devices can be a computing device capable of executing a telephone-related application (e.g., WiFi calling system, VoIP phone, etc.). Examples of computing devices include personal computers, television set top boxes, mobile smartphones, laptops, personal digital assistants ("PDAs"), tablet computers, e-book readers, smart devices and wearables, or any computing device having a central processing unit and memory unit capable of connecting to a communications network. The computing device may also comprise a graphical user interface (GUI) or a browser application provided on a display (e.g., monitor screen, LCD or LED display, projector, etc.). A computing device may also include or execute an application to communicate content, such as, for example, textual content, multimedia content, or the like. A computing device may also include or execute an application to perform a variety of possible tasks, such as browsing, searching, playing various forms of content, including streamed audio and video. A computing device may include or execute a variety of operating systems, including a personal computer operating system, such as a Windows, Mac OS or Linux, or a mobile operating system, such as iOS, Android, or Windows Mobile, or the like. A computing device may include or may execute a variety of possible applications, such as a computing software application enabling communication with other devices, such as communicating one or more messages, such as via electronic mail message, SMS, or MMS.

Alternatively, the registry 100 may be accessed by a third party service 110 such as an email or texting service or telecommunications carrier 112 directly or through a server 114. The server 114 receives a request from the third party service 110 or carrier 112 to identify a telephone number in the registry 100 and processes the request in similar fashion to the apps 104, 106, as further described herein. The server 114 then returns the necessary data from the registry 100 and the results of the validation to the third party service 110 or carrier 112, which then processes the communication based on those results as further described herein. The servers, systems, databases and networks in the disclosed system may vary widely in configuration or capabilities, but generally include one or more central processing units ("CPUs") and memory and may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Scenarios exist where many incoming communications from repetitive callers (e.g., call centers of financial institutions) may be rejected by carrier networks or users. These incoming communications may be rejected, among other reasons, because the repetitive nature of the incoming communications makes the incoming communications appear as robocalls or telemarketing calls and these types of calls are unwanted by users.

The app 104, 106 or server 114 receiving such incoming communications may consult the registry 100 to determine if the calling party has an entry in the registry 100. In some embodiments each incoming communication is checked and validated in real time as received. In other cases, the apps 104, 106 or server 114 may have previously searched the registry 100 for a particular telephone number and locally stored the results for that calling party for reuse when more communications are detected from the same number. This is particularly useful for legitimate callers such as banks that place many calls or send many similar communications using the same source telephone number(s) and the same sets of associated data stored in the registry 100 including the public key and communication intent data.

In accordance with embodiments of the invention, the registry 100 may also store parameters or criteria set by a user in association with the user's telephone number. The parameters may be set by the user to control whether the registry 100 needs to be checked for incoming communications. The parameters or criteria may also dictate what conditions need to be satisfied to allow a communication to proceed to the called party. For example, the called party may set criteria on the types of parties from which it is willing to receive communications, the types of communication intent about which it is willing to receive communications, the days or times of day it is willing to receive such communications, and other conditions. The parameters may also set how the user would like the communications handled, such as whether to block the calls, allow the calls to ring, perform additional screening on the calling party, and other options, as explained further below. The apps 104, 106 or server 114 would then be configured to search for and access the registry 100 entry for the called party's number, retrieve the parameters stored in association with that number, and apply them using preset rules to determine whether to perform validation of the calling party's number and how to handle the communication based on the called party's parameters or criteria. In some embodiments, when an incoming communication is determined that it should be subjected to validation using the registry 100, it can be subjected to processing that is either general or specific to the called party before it continues on to the called party.

As discussed above, the registry 100 stores and can provide additional information about the caller that would be helpful to the apps 104, 106, the server 114 and/or the called party. The registry 100 may contain additional information about a general or specific communication instance between a calling party and a called party, such as the purpose of a specific call or the purpose of general communications using a given number operated by the calling party. By appending this information to the caller identification field, it may be displayed to called parties on their phones or other communication devices in the caller ID field, and the called parties are thus more well informed of the purpose of an incoming communication and likely to answer or otherwise respond to the incoming communication. As an example, Sirius XM's call center can have a communication intent stored with certain telephone numbers that identify the call as for alerting the user to the fact that the free trial period is expiring. By appending this information to the caller identification, called parties are more likely to properly handle the incoming communication because they know the intention behind the communication.

Figure 2:
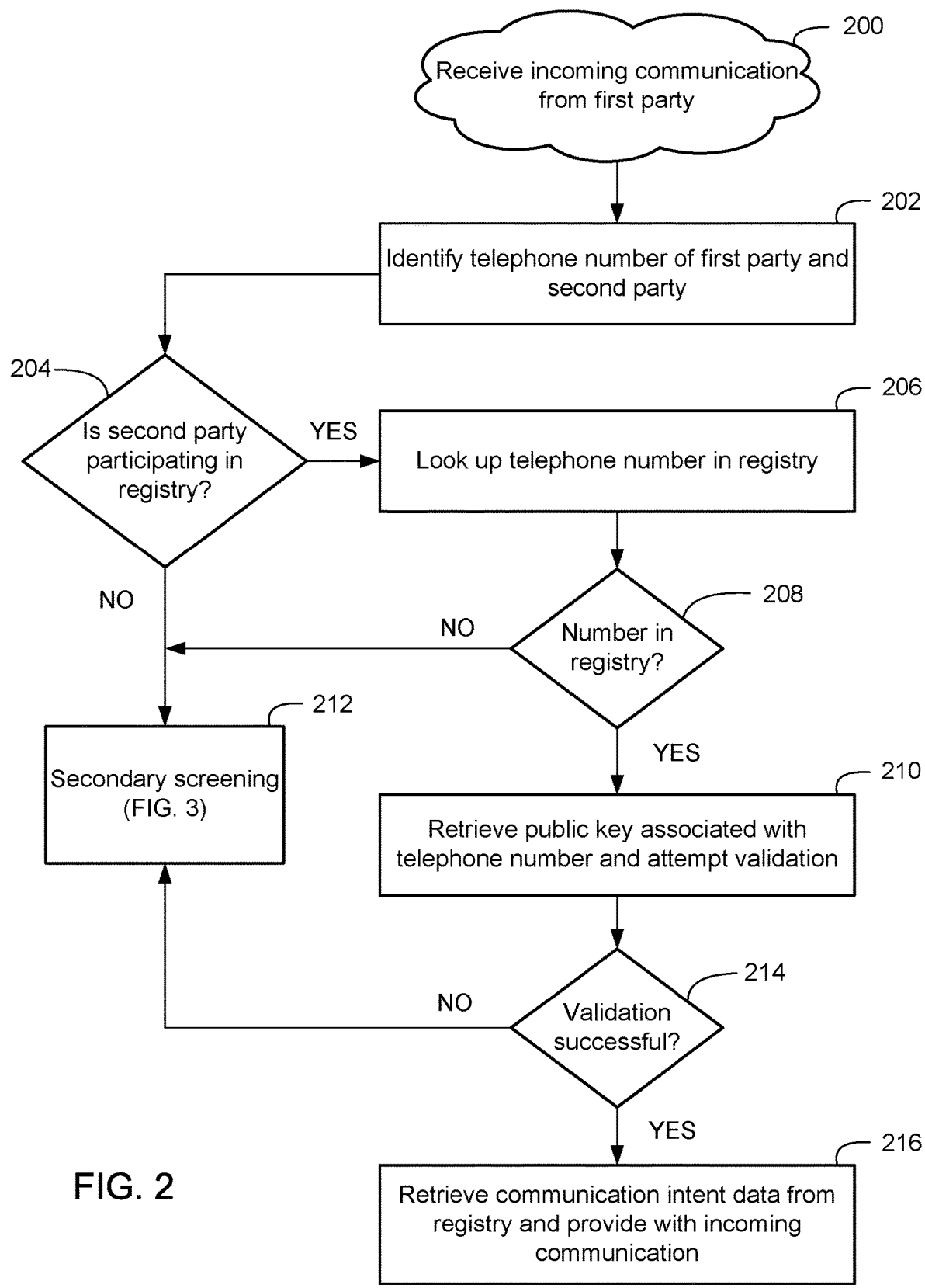
FIG. 2 illustrates a flowchart of a method for storing and using the register to authenticate callers and provide additional information including communication intent data to users in accordance with some embodiments of the invention.

FIG. 2 illustrates a flowchart of a method for using a registry to validate callers and provide additional information to called parties in accordance with some embodiments of the invention. The method, which may be performed by the apps 104, 106 or by the server 114, begins when an incoming communication is being received from a first party directed to a second party, step 200. The communication may be a call, text message, email or the like, though for purposes of these embodiments the communication is between telephone devices having telephone numbers as identifiers. The communication may be digitally signed by the first party with a private key or include encrypted details that can be used by validation, or the incoming number, time and called party information can be used to consult a registry as disclosed above. The telephone numbers of the first and second parties are identified from the communication, step 202.

The method then proceeds to step 204 which determines whether the incoming communication is to a second party that participates in the registry for the purposes of validating communications. This may be performed by searching the registry for that second party's number, or by checking locally stored data if the registry was previously retrieved. If no, the method proceeds to secondary screening, step 212, whereby the called party has pre-determined how they wish to handle calls from calling parties that do not participate in the registry, which may be to drop the call or simply suppress awareness of the call and allow a secondary screening process to occur, as described further with reference to FIG. 3.

If the result of step 204 is yes, the called party is participating in the registry, method proceeds to look up the telephone number of the calling party, step 206, to determine whether it is in the registry, step 208. If the calling party's number is not in the registry, the method proceeds to secondary screening, step 212, in accordance with standard procedures or the called party's set criteria. If the calling party's number is in the registry, public key data associated with that calling party's entry in the registry is retrieved, step 210, and used to validate the incoming communication by using the public key to decrypt the digitally signed incoming communication. If the call is validated successfully, step 214, the method proceeds to step 216 where additional data from the registry associated with the calling party's number is retrieved included for processing, presenting or displaying with the incoming call. For example, the additional data retrieved from the registry can be included in a data field below the caller identification which can include the caller's identity, communication intent or other information. In another example, the communication intent may be categorized as a sales or survey intent and the called party has set parameters that they do not wish their communication device to make any auditory, visual or physical indication of this call but instead subject it to an automated response or other call processing behaviors. The communication is then connected or completed.

Figure 3:
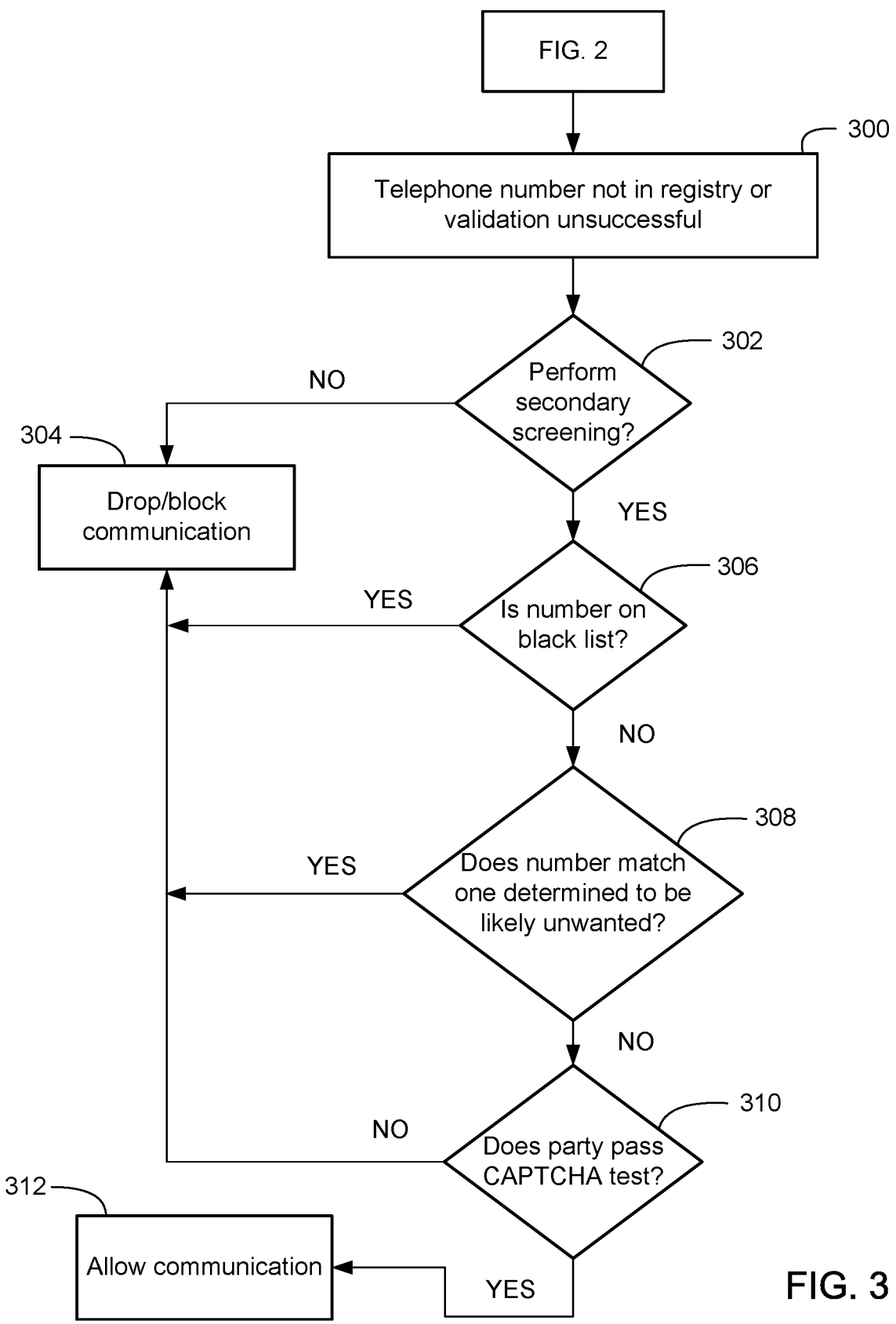
FIG. 3 illustrates a flowchart of a method for handling communications that are not in the registry or not validated by data in the registry in accordance with some embodiments of the invention.

FIG. 3 illustrates a flowchart of a method for performing secondary screening on an incoming communication in accordance with some embodiments of the invention. This method is performed if during the validation process set forth in FIG. 2, the telephone number of the calling party is determined to not be found in the registry or validation of the digitally signed communication using the retrieved public key is unsuccessful, step 300. In that case a decision is made whether to perform secondary screening on the calling party, step 302. That decision may be based on parameters set in the registry for the called party as explained above, or may be based on default settings in the app or server performing the validation. The decision may also be based on whether the calling party is simply not in the registry, which may not be an indication that the calling party's communication is unwanted, or if the validation was unsuccessful, which may suggest fraudulent activity. For example, the user may have set parameters in the registry setting a condition or rule that if the calling party is not in the registry a regular sequence of screening is performed but if the calling party fails validation the communication is blocked.

If no screening is to be performed, the communication is blocked or dropped, step 304. Otherwise, the incoming call is passed through various tests to determine whether the incoming call is wanted/unwanted or known/unknown. For example, the calling party's telephone number may be checked against a black list, step 306, and if it is on the list the call is blocked or dropped, step 304. The incoming call can otherwise be passed through other tests to determine is the communication is wanted or unwanted, step 308. This may include fingerprinting techniques as disclosed in U.S. Pat. No. 10,051,121, owned by YouMail, Inc., the assignee of the present application. Depending on parameters set by the calling party, if the call is determined to be unwanted it is blocked, step 304, or handled in some other fashion set by the user. In some embodiments an audio CAPTCHA (or a challenge-response) test may be performed on the calling party, step 310. If the incoming communication passes all the screening, the communication is allowed, step 312, and the call is connected to the user or the message is sent to the user's device.

Figure 4:
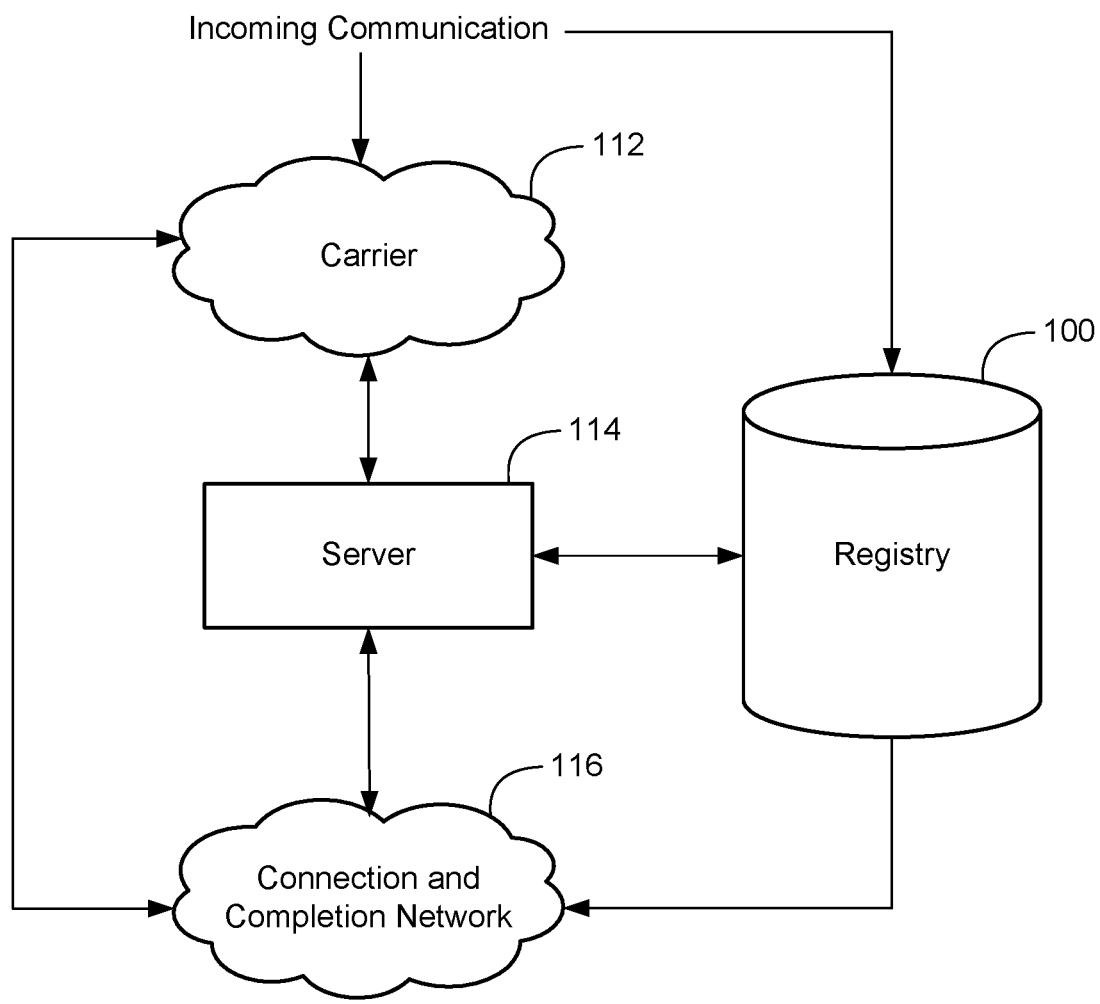
FIG. 4 illustrates a block diagram for a system for allowing telecommunication carriers to access the registry and systems shown and described in FIGS. 1-3 in accordance with some embodiments of the invention.

Referring now to FIG. 4, as explained above the system can allow access to the registry 100 by a telecommunication carrier 112. In some embodiments, the carrier network 112 is communicatively coupled to the server 114, which is communicatively coupled to the registry 100 and a connection and completion network 116. The call connection and completion network 116 is communicatively coupled to the carrier network 112 to allow for connecting telephone calls received via a user on the carrier network 112. The carrier network 112 and call connection and completion network 116 can be communicatively coupled directly to the registry 100 if desired.

In operation, the identification of an incoming communication, such as a telephone number, electronic mail address, etc., can be received and recorded by the carrier network 112 and transmitted to the server 114. The telephone number may be any type of telephone number (e.g., landline, cellular, VoIP, etc.) and can be identified via caller identification or other similar services. The server then performs the methods described above to search the registry 100, validate the communication, perform any other necessary screening on the communication, and return the results to the carrier 112 or the call connection and completion network 116, which then facilitate connecting the call or otherwise sending he communication.

FIGS. 1-4 are conceptual illustrations allowing for an explanation of embodiments of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer readable medium," "computer program medium," and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments but should be defined only in accordance with the following claims and their equivalents.

In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A system for validating an incoming communication originating from a first party having a first telephone number and directed to a second party, the system comprising:
   a server comprising memory and a processing device configured to:
      determine the first telephone number is associated with a party having a corresponding entry in a publicly accessible registry, the registry comprising a plurality of telephone numbers each associated at least with a public key and additional data representing a communication intent;
      use a public key associated with the first telephone number in the registry to validate the incoming communication;
      retrieve communication intent data associated with the first telephone number in the registry; and
      provide the communication intent data to the second party for display on a device used by the second party in association with the incoming communication.

2. The system of claim 1, wherein the server is configured to determine the first telephone number is associated with a party having a corresponding entry in a publicly accessible registry by identifying the first telephone number from the incoming communication and searching the registry for the identified first telephone number.

3. The system of claim 1, wherein the communication intent data comprises data representing a general intention of communications associated with the first telephone number.

4. The system of claim 1, wherein the communication intent data comprises data specific to communications between the first party and the second party provided either for the specific instance of the incoming communication or to cover a time period of communications between the first and second parties.

5. The system of claim 1, wherein the server is configured to retrieve the public key from the registry during or prior to the incoming communication.

6. The system of claim 1, wherein the communication intent data includes an enhancement to a visual, auditory or physical identification of the incoming communication.

7. The system of claim 1, wherein the incoming communication is selected from a group consisting of a telephone call, an electronic message and a text message.

8. The system of claim 1, wherein the server is configured to:
   determine the first telephone number is not associated with a party having a corresponding entry in the registry; and
   block the incoming communication from going through to the second party.

9. The system of claim 1, wherein the server is configured to:
   determine the first telephone number is not associated with a party having a corresponding entry in the registry;
   evaluate whether the first party is a wanted or unwanted communicator; and
   process the incoming communication based on the evaluation.

10. The system of claim 1, wherein the incoming communication is digitally signed by the first party using a private key, and wherein the server is configured to validate the incoming communication by using the public key to decrypt the digitally signed incoming communication.

11. A method for validating an incoming communication originating from a first party having a first telephone number and directed to a second party, the method performed by a computerized device comprising memory and a processing device, the method comprising:
   determining the first telephone number is associated with a party having a corresponding entry in a publicly accessible registry, the registry comprising a plurality of telephone numbers each associated at least with a public key and additional data representing a communication intent;
   using a public key associated with the first telephone number in the registry to validate the incoming communication;
   retrieving communication intent data associated with the first telephone number in the registry; and
   providing the communication intent data to the second party for display on a device used by second party in association with the incoming communication.

12. The method of claim 11, wherein determining the first telephone number is associated with a party having a corresponding entry in a publicly accessible registry comprises:
   identifying the first telephone number from the incoming communication; and
   searching the registry for the identified first telephone number.

13. The method of claim 11, wherein the communication intent data comprises data representing a general intention of communications associated with the first telephone number.

14. The method of claim 11, wherein the communication intent data comprises data specific to communications between the first party and the second party provided either for the specific instance of the incoming communication or to cover a time period of communications between the first and second parties.

15. The method of claim 11 further comprising retrieving the public key associated with the first telephone number from the registry prior to the incoming communication.

16. The method of claim 11, wherein the communication intent data includes an enhancement a visual, auditory or physical identification of the incoming communication.

17. The method of claim 11, wherein the incoming communication is selected from a group consisting of a telephone call, an electronic message and a text message.

18. The method of claim 11 further comprising:
   determining the first telephone number is not associated with a party having a corresponding entry in the registry; and
   blocking the incoming communication from going through to the second party.

19. The method of claim 11 further comprising:
   determining the first telephone number is not associated with a party having a corresponding entry in the registry;
   evaluating whether the first party is a wanted or unwanted communicator; and
   processing the incoming communication based on the evaluation.

20. The method of claim 11, wherein the incoming communication is digitally signed by the first party using a private key, and wherein using the public key to validate the incoming communication comprises using the public key to decrypt the digitally signed incoming communication.

* * * * *